United States Patent
Belloni et al.

[11] Patent Number: 6,124,566
[45] Date of Patent: Sep. 26, 2000

[54] AUTOMATIC TRACKING PROCESS OF THE JOINT BEVEL FOR THE BUTT WELDING OF PIPES AND EQUIPMENT FOR THE EMBODIMENT OF THE PROCESS

[75] Inventors: Antonio Belloni, Codogno; Luca Di Stefano, Turin, both of Italy

[73] Assignee: SAIPEM S.p.A., San Donato Milanese, Italy

[21] Appl. No.: 09/087,913

[22] Filed: Jun. 1, 1998

[30] Foreign Application Priority Data

Jun. 26, 1997 [IT] Italy ................................. MI97A1511

[51] Int. Cl.[7] ................................................. B23K 9/127
[52] U.S. Cl. .................................. 219/124.34; 219/125.12
[58] Field of Search ......................... 219/124.34, 124.22, 219/125.12

[56] References Cited

U.S. PATENT DOCUMENTS

| 4,151,395 | 4/1979 | Kushner et al. | 219/124.34 |
| 4,350,868 | 9/1982 | Takagi et al. | 219/124.22 |
| 4,380,695 | 4/1983 | Nelson | 219/124.34 |
| 4,417,126 | 11/1983 | Kasahara et al. | 219/124.34 |
| 4,495,400 | 1/1985 | Thompson | 219/124.22 |

FOREIGN PATENT DOCUMENTS

| 0 402 648 | 12/1990 | European Pat. Off. . |
| 59-191575 | 10/1984 | Japan . |

Primary Examiner—Clifford C. Shaw
Attorney, Agent, or Firm—Oblon, Spivak, McClelland, Maier & Neustadt, P.C.

[57] ABSTRACT

A process for automatically tracking a joint bevel during butt welding of coaxial pipes includes the steps of observing electrical parameter values relating to the voltage, current and voltaic arc impedance and comparing these values with preset sample values stored in a governing unit. The governing unit controls a driving source for the orientation of the welding torch in the joint bevel.

13 Claims, 2 Drawing Sheets

AUTOMATIC TRACKING PROCESS OF THE JOINT BEVEL FOR THE BUTT WELDING OF PIPES AND EQUIPMENT FOR THE EMBODIMENT OF THE PROCESS

BACKGROUND OF THE INVENTION

1. Field of the Invention

The present invention relates to an automatic tracking process of the joint bevel and the relative equipment for the welding of coaxial pipes by means of an operation with which two pipes are joined with several runs of welding material, so as to form a material continuity without "side of lack fusion" defects.

More specifically, this equipment comprises a governing unit based on a miniprocessor in which sample values of electrical parameters are inserted to compare them with the parameters of voltage, current and voltaic arc impedance values, in order to generate command signals which activate and pilot the driving source programmed for the variations in the position of an oscillating welding torch so that the run of welding material is basically deposited at the center of the throat of the joint bevel formed by the counterfacing coaxial pipe ends.

In the following description and claims the term "joint bevel" indicates the space or throat which appears with the "bevelling" of the appropriate pipe ends of the counterfacing butts of the coaxial pipes to be welded, and the term "pipe" or "piping" indicates any substantilly circular-shaped tubing.

2. Discussion of the Background

Orbital equipment is known in the art, for the welding process with the well-known applicative "GMAW" (gas metal arch welding) method; in particular the "MAG" or "MIG" (metal active gas, or metal inert gas) versions. This known equipment essentially consists of a circular track which is fitted and blocked on the piping and at least one movable welding trolley which moves at a controlled rate along the track circling around the piping. The welding trolley, which preferably moves in both rotatory directions, is equipped with locking and sliding wheels on the track, a notched driving pinion which engages with a corresponding notched edge of the track itself for the orbital movement of the trolley and at least one oscillating welding torch of the continuous wire type.

The welding technique for pipes with orbital movement consists of depositing, by means of repeated passes of the welding trolley, a series of superimposed welding runs in the joint bevel. For this purpose the track is positioned near the joint bevel, the welding trolley is attached to this, and the voltaic arc of the torch of the welding trolley is in line with the axis of the joint bevel.

Owing to the "bevelled" shape of the joint bevel, the quantity of welding material gradually increases as the torch moves, with each pass, further away from the pipe axis. The torch, which is initially fixed with respect to the trolley, is consequently subjected to an oscillating movement whose extent, frequency and stasis (stoppage after each oscillation) vary both in the passage from one welding run to another and in effecting the same welding run in relation to the position of the trolley on the circumference of the pipe due to the influence of gravity on the welding metal in its liquid state. The orbital movement rate of the trolley and feeding rate of the welding wire also depend on the position of the trolley on the circumference of the pipe and these parameters, as also the extent, frequency and stoppage of the oscillation of the torch, in present orbital welding equipment, are controlled and piloted using sensors of the mechanical, magnetic, optical or "laser" type.

These solutions have proved to have disadvantages for the butt welding of pipe-lines, especially pipelines having a considerable wall thickness. In particular there is the formation of "side of lack fusion," which is typical of cases in which the welding pass is not centered and melts only one side of the joint bevel leaving the other unmelted. The resolution degree of the tracking system required for automatized systems, i.e. the capacity of the system of maintaining the welding pass in the center of the joint bevel thus avoiding the formation of "side of lack fusion" defects, is very high and is more or less about a tenth of a millimeter, or at the most two tenths of a millimeter (from ±0.1 to ±0.2 mm). The resolution degree of a sensor of the mechanical type is of about 5 tenths of a millimeter (±0.5 mm) and therefore, as an absolute value, too high with respect to the quality of welding required (±0.1–0.2 mm). The mechanical sensor, moreover, is connected to the welding torch by means of a bracket which in practice accentuates the parallelism error between the axis of the welding torch and the axis of the joint bevel. This error is also evaluated as being more or less 5 tenths of a millimeter (±0.5 mm).

The industrial solutions of the known art which operate with the use of sensors of the magnetic, optical or "laser" type, have a better resolution degree than those which adopt a mechanical sensor, but also require a connection bracket to the welding torch which still generates a higher error than the quality requested. It is evident however that the correct performance of the welding process absolutely depends on the exact piloting of the mechanical units forming the welding trolley which must also be equipped with units capable of ensuring the correct oscillation of the torch and the correct feeding of the welding wire. In particular, the movement of the trolley must not be influenced by the diameter of the track and position of the trolley on the circumference of the pipe. Similarly the mechanical units which govern the feeding of the welding wire must exert an effective traction on the wire itself to be able to accelerate or decelerate the feeding without there being any slippage between the wire and the traction device. In the same way, the units which govern the oscillation of the welding torch must ensure the correct functioning of the oscillation itself in terms of width, frequency and stasis.

SUMMARY OF THE INVENTION

The aim of the present invention is essentially to achieve these objectives and in particular to guarantee the constant depositing of the welding pass in the center of the joint bevel with a minimum tolerance of error, and to obtain other perfectly repeatable objectives with respect to the quality by means of a process and automatic equipment which give impeccable results by an overall perfectioning which synergetically and decisively improves the functioning and reliability of specific orbital welding equipment.

In particular, the purpose of the present invention is to provide the welding trolley with efficient instruments suitable for reading the electrical parameters to perfect the system which governs the guiding and oscillation of the welding torch, enabling the welding torch to constantly deposit the welding material in the center of the joint bevel, thus avoiding the formation of any kind of defect.

The present invention achieves this and other objectives which will appear in the detailed description which follows, by means of a process which constantly reveals the electrical parameter values relating to the voltage, current intensity and voltaic arc impedance during the continuous movement of the oscillating continuous-wire welding torch; compares the electrical parameter values indicated with sample parameter values fixed and preset in a governing unit to determine the shifting between these values; pilots the variation in the movements of the welding torch activating, each time the shifting exceeds a preset and memorized limit range, a driving source which directs the torch so that the welding run is deposited at the center of the throat of the appropriate joint bevel of the counterfacing butts of the pipes to be welded and placing the welding run over the axis of the joint bevel; enables the use of a protective atmosphere of active gas, such as carbon dioxide; carries out the welding of extremely thick pipes with greatly reduced wall angles which at the most tend towards zero.

The process of the present invention also enables the constant deposit of the welding run at the centre of the joint bevel thus avoiding the formation of "side of lack fusion". In addition the process of the present invention allows coaxial pipes to be joined, with wall angles oscillating between 0° and 12° and consequently with limited bevel angle.

The process of the present invention consists for its embodiment in an apparatus which comprises a governing unit based on a miniprocessor in which the sample values of the electrical parameters relating to voltage, current and impedance of the operative welding group are inserted, by means of a command keyboard, together with the limit value of the acceptable tolerance of the shifting of the deposit of the welding run from the centre of the joint bevel, which is considered as not being harmful for the welding information, and these values are processed, in the calculating center of the miniprocessor, for the computerized observation of the optimum reference characteristics for the welding process, and subsequently electric impulses are transmitted to the miniprocessor, of the parameters of the voltage, current and impedance values, appropriately amplified, generated by the voltaic arc to provide the real values of the welding process. These real values are compared, in the electrical comparator of the miniprocessor, with the above sample values in order to generate, in continuous succession, several command signals which activate and pilot the driving source which governs the movements of the variations in position of the oscillating continuous-wire welding torch so that the run of welding material is continually deposited in the centre of the joint bevel with a tolerance of lateral movement of not more than two tenths of a millimeter as acceptable limit shifting value for a high quality welding without "side of lack fusion" defects.

According to one embodiment, the apparatus for effecting the process of the present invention has, at least in the welding of two coaxial pipes, a holding device for the voltaic torch.

BRIEF DESCRIPTION OF THE DRAWINGS

With reference to what is specified above, the enclosed tables illustrate a preferential embodiment which is not limiting or restricting with respect to the reciprocal position of the components and consequent simplifications which can derive therefrom; this embodiment is described hereunder together with the process, referring to the following figures, wherein.

Figure 1:
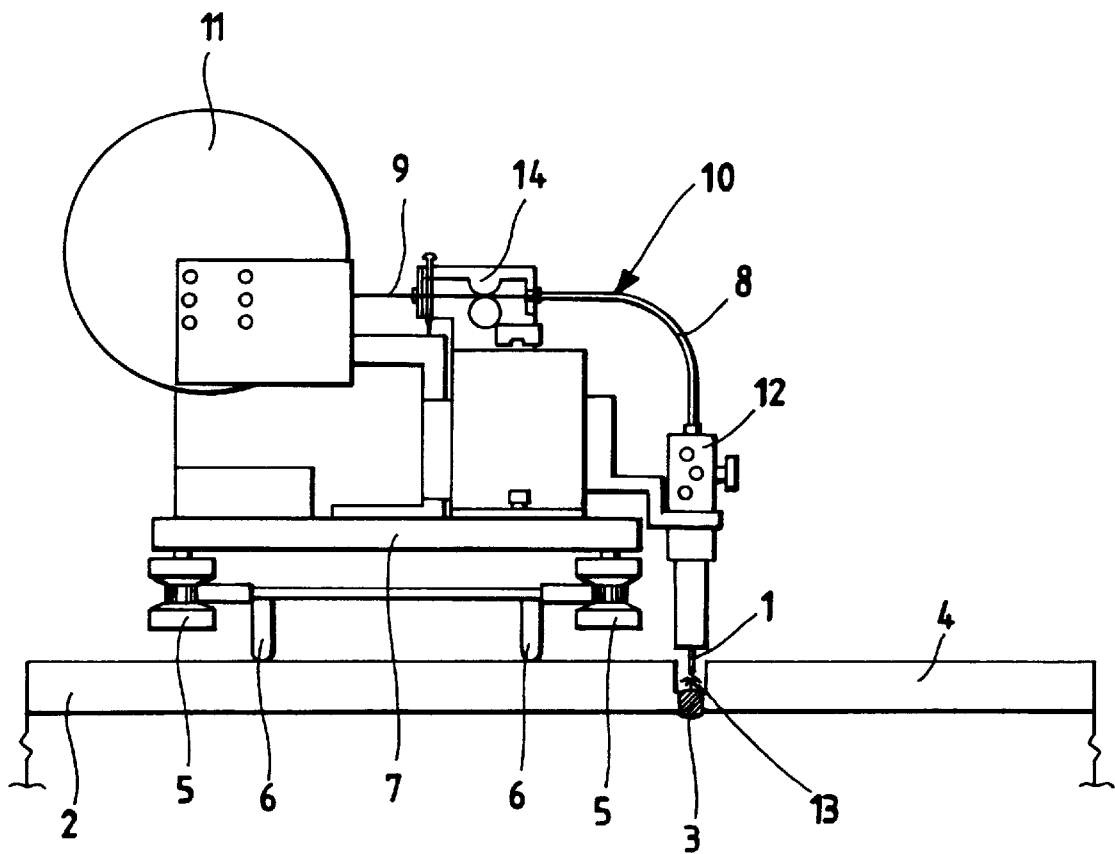
FIG. 1 schematically illustrates an upper side view of the apparatus of the invention, which is shown in its operating position over the pipes to be welded.

In the figures, for the sake of simplicity, corresponding parts have identical reference characters. The devices, elements and mechanisms which operate in reciprocal co-ordination with the apparatus which effects the process of the present invention are not illustrated and their functioning is not described as this is already known and does not relate to the embodiment of the invention in question.

Figure 2:
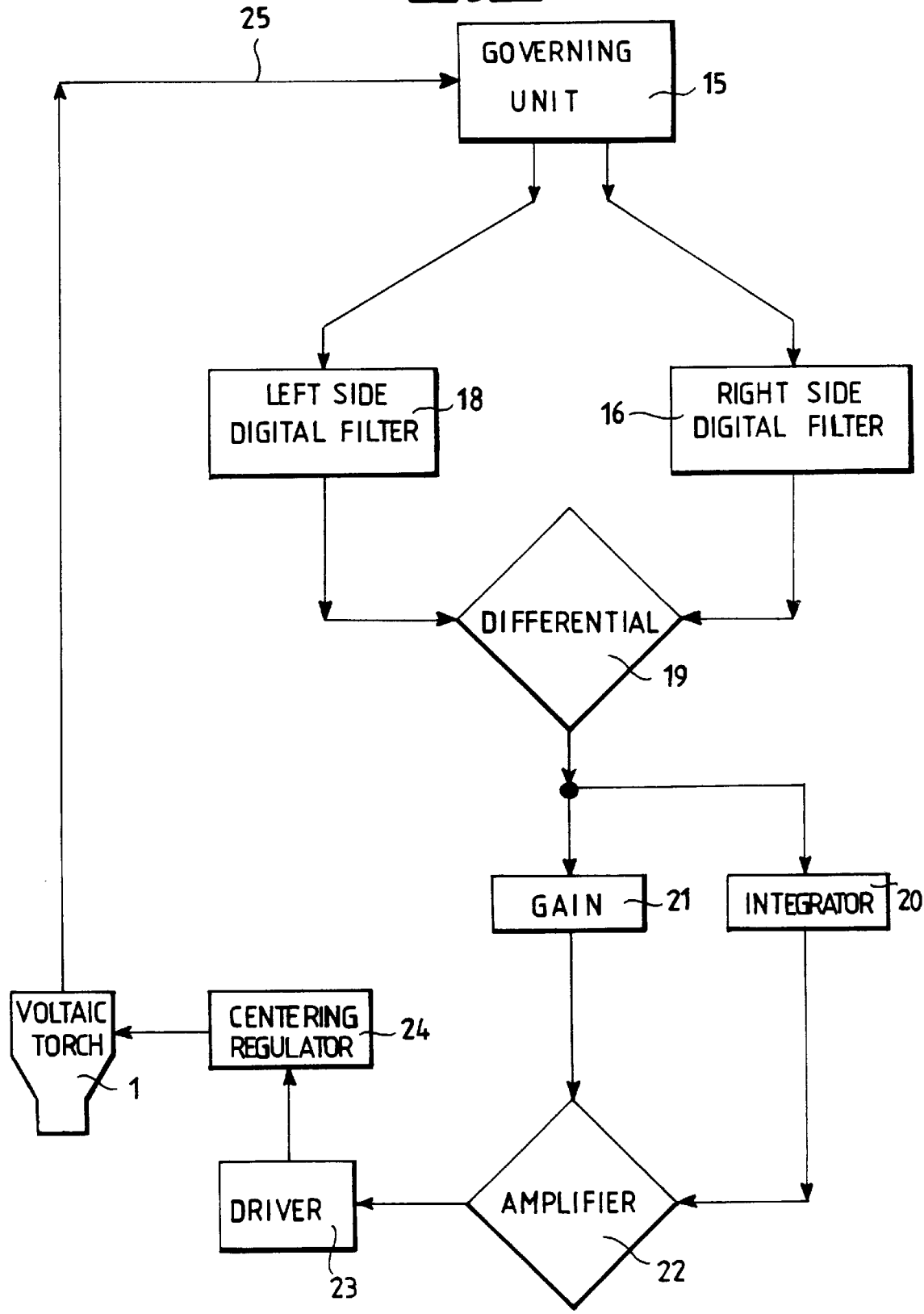
FIG. 2 illustrates the block diagram of the functioning circuit of the automatic tracker of the joint bevel for the butt welding of substantially coaxial pipes.

In FIGS. 1, 2 and 4 generally indicate the pipes to be welded, 6 the track fitted and blocked as a single unit on the pipe 2 to be butt welded to pipe 4. The track 6 is positioned in correspondence with and near the joint bevel 13, and 5 indicates a pair of rolls, suitably shaped, which with an orbital movement pull and guide the whole apparatus 10 which effects the welding process using runs of welding material 3 substantially deposited in the center of the joint bevel 13. The welding apparatus 10 rotates in both directions on the circumference of the piping for at least a complete circle of 360° C. This apparatus 10 is preferably equipped with a couple of counterfacing pinions 5 which are locked and slide on the track 16 whose notched edges engage with these coupled pinions 5. The latter are moved in rotation by any kinematical chain which is appropriately driven by a stepper motor, or similer driving source, not illustrated as it is already known.

According to the present invention, the base plate 7 is an element which blocks and supports the motor pinions 5, the voltaic welding torch 1, the supporting brackets of the wire spool 11 for the welding wire 9 which continuously feeds the voltaic torch 1 to generate the welding run 3 in the joint bevel 13. This welding wire 9 is unwound from the wire spool 11 by means of a pulling device 14 which conveys it into the guiding pipe 8, to send it through the straining device 12 to the voltaic torch 1. The wire spool 11, the pulling device 14 and the straining device 12 are schematically illustrated as their construction and functioning are well known to experts in the field. The operative functioning of the equipment which embodies the process of the present invention can be easily understood with the help of the figure which illustrates the block diagram of the functioning principle of the automatic tracker of the joint bevel for the welding of pipes.

At the beginning of the butt welding of pipes 2 and 4 which are coaxial with each other, the apparatus 10 is blocked with known means and methods onto the external circumferential zone of the pipe in order to position the oscillating continuous-wire welding torch 1 in the centre of the joint bevel 13. All this, as is well known to experts in the field, is to enable the welding of the pipes by the deposit of various passes of welding material 3 to obtain material continuity between said pipes with the formation of a welded joint without "side of lack fusion" defects. During the welding operation of the pipes 2 and 4, the functioning of the automatic tracker of the joint bevel tested and claimed by the applicant of the present invention is based on the innovative principle that during the operative oscillation of the welding torch 1, when the wire 9 of the welding material with the relative welding bath approaches the walls of the joint bevel, these walls exert a direct influence on the electrical values relating to the voltage, current intensity and voltaic arc impedance. In the actual embodiment of the welding of a mechanically perfect joint bevel, the influence of the walls on the above electrical parameters is identical on both the counterfacing walls of the pipes 2 and 4 positioned for butt welding. On the contrary, if the voltaic torch is not centred in the space of the joint bevel, the influence on the electrical parameter values and the difference in values between homogeneous electrical magnitudes will determine the information in the miniprocessor of the governing unit 15, relating to the central position error of the torch 1 in the joint bevel 13. More specifically, on comparing the electrical magnitude values of voltage, current and impedance (V; I; Z) relating to the right side with those relating to the left side at the very moment when the welding wire 9 approaches the respective walls, during the continuous movement of the torch 1, the following operative situations are activated: in a non-centered position of the torch 1 in the joint bevel 13, at the side where the welding wire 9 and relative welding bath are closest to a wall, there will be a decrease in the voltaic arc impedance with respect to the opposite side. This operative situation, in the presence of a generator with decreasing functional characteristics "V–1", generates a reduction in the voltage value and consequently an increase in the current intensity value. Corrections in the positions of the voltaic torch 1 in the joint bevel space 13 are achieved with the control apparatus of the present invention in real time and, at each instant, during the orbital advancing of the welding wire 9, which, as it melts in the bath of welding material, forms the welding run 3.

The block diagram of FIG. 2 illustrates the control system of the automatic tracking process of the joint bevel of the present invention, which consists in revealing, at each instant, the electrical parameter values of voltage, current intensity and voltaic arc impedance relating to the right wall and left wall which define the space of the joint bevel. These electrical parameter values which are revealed in correspondence with the voltaic torch 1 are continuously conveyed through the cable 25 into the governing unit 15 which processes them, as inlet parameters, in its miniprocessor to generate at the oulet two groups of internal synchronism signals of the active right side and active left side. Both signal groups mark a spacial portion of the oscillation and are sent separately to acquisition filters consisting of two digital filters which can be independently programmed, one for the right side 16 and the other for the left side 18. Both filters 18 and 16 produce at the outlet a voltage, current and impedance value relating to their own side. The difference between the right side or wall and the left side or wall is calculated in the differential 19 as a continuous calculation center and is used in real time for controlling the position of the voltaic torch 1 in the space 13 of the joint bevel. If the difference registered remains in absolute value less than or equal to a fixed and preset sample difference in relation to the tolerance accepted in the central position of the welding wire 9 of the voltaic torch 1 in the space of the joint bevel 13 defined by the right wall and the left wall of the counterfacing pipes 2 and 4. The latter observation of the defined and accepted difference generates signals which are continuously sent to the integrator 20 to regulate the positioning of the continuous oscillation of the voltaic torch 1 during the welding process. If the oscillation remains near the orbital central line of the joint bevel, with a perfect compensation of right and left limited movements, the integrator 20 will not generate any centering movement command signal through the amplifier 22. Should the oscillation, although limited within the accepted tolerance value, prevalently remain in a right or left zone with respect to the central line of the joint bevel 13, the integrator 20 will activate a signal, which by means of the amplifier 22, will pilot the centering movement command of the torch 1, by the drive 23 and centering regulator 24 to program the time of oscillation of the voltaic torch 1 around the central line of the joint bevel and within the accepted and preset tolerance limits. If the oscillation of the voltaic torch 1 has higher values than those of the accepted and preset tolerance with the risk of "side of lack fusion," the differentiator 19 reveals dangerous differences among the electrical parameter values observed between the right and left walls, and a signal is generated which activates the "gain" 21 to activate a command signal by means of the amplifier 22, for the drive 23 of the centering movement, with subsequent centering regulation 24 to pilot and move the welding torch 1, so that the welding run 3 is deposited in the center of the throat of the appropriate joint bevel formed by the counterfacing butts of the pipes 2 and 4 to be welded and the welding run 3 is consequently superimposed on the symmetrical axis of the space of the joint bevel 13.

This is a preferred embodiment. However it is evident that other embodiments are possible which are included in the scope of the present invention.

The drive arrangements can be varied and it is also possible to add or remove operative elements on the equipment to advantageously co-ordinate the combination of the various drive and control phases of the welding process of pipes having various thicknesses and diameters.

These and other variations are possible without being excluded from the scope of the present invention. The Italian priority application No. M197A 001511 is herein incorporated by reference.

What is claimed is:

1. A method for automatically tracking a joint bevel with a welding torch during butt welding of two pipes, said method comprising the steps of:

determining, for both a left wall and a right wall of the joint bevel, measured electrical parameter values including a voltage, a current, and a voltaic arc impedance while the welding torch moves continuously;

comparing respective of the measured electrical parameter values for the right wall with respective of the measured electrical parameter values of the left wall to generate measured electrical parameter differences corresponding to the voltage, the current, and the voltaic arc impedance;

comparing the measured electrical parameter differences with corresponding predetermined electrical parameter differences to generate corresponding shift values; and controlling a driving source to adjust the movement of the welding torch when at least one of the shift values exceeds a corresponding predetermined limit.

2. A method according to claim 1, further comprising the step of:

superimposing a welding run on an axis of the joint bevel with the welding torch.

3. A method according to claim 1, further comprising the step of:

joining coaxial pipes with the welding torch, the coaxial pipes having wall angles of from 0° C. to 12° C.

4. A method according to claim 1, wherein the shift values correspond to the voltage, the current, and the voltaic arc impedance.

5. A method according to claim 4, wherein the predetermined limit corresponds to one of: the voltage, the current, and the voltaic arc impedance.

6. A system for automatically tracking a joint bevel with a welding torch, comprising:

a memory configured to store predetermined electrical parameter values, the predetermined electrical parameter values including a predetermined voltage, a predetermined current, and a predetermined voltaic arc impedance; and a processor configured to determine, for both a left wall and a right wall of the joint bevel, measured electrical parameter values including a measured voltage, a measured current intensity, and a measured voltaic arc impedance, while the welding torch continuously moves; configured to compare respective of the measured electrical parameter values for the right wall with respective of the measured electrical parameter values for the left wall to generate measured electrical parameter value differences corresponding to the voltage, the current, and the voltaic arc impedance; configured to compare the measured electrical parameter value differences with corresponding of the predetermined electrical parameter values stored in the memory to generate corresponding shift values; and configured to cause a driving source to adjust the movement of the welding torch when one of the shift values exceeds a corresponding predetermined limit.

7. A method according to claim 6, wherein the shift values correspond to the voltage, the current, and the voltaic arc impedance.

8. A method according to claim 7, wherein the predetermined limit corresponds to one of: the voltage, the current, and the voltaic arc impedance.

9. A system for automatically tracking a joint bevel with a welding torch during butt welding of two pipes, comprising:

means for determining, for both a left wall and a right wall of the joint bevel, measured electrical parameter values including a voltage, a current, and a voltaic arc impedance while the welding torch moves continuously;

means for comparing respective of the measured electrical parameter values for the right wall with respective of the measured electrical parameter values of the left wall to generate measured electrical parameter differences corresponding to the voltage, the current, and the voltaic arc impedance;

means for comparing the measured electrical parameter differences with corresponding predetermined electrical parameter differences to generate corresponding shift values; and means for controlling a driving source to adjust the movement of the welding torch when at least one of the shift values exceeds a corresponding predetermined limit.

10. A system according to claim 9, further comprising:

means for superimposing a welding run on an axis of the joint bevel with the welding torch.

11. A system according to claim 9, further comprising:

means for joining coaxial pipes with the welding torch, the coaxial pipes having wall angles of from 0° C. to 12° C.

12. A system according to claim 9, wherein the shift values correspond to the voltage, the current, and the voltaic arc impedance.

13. A system according to claim 12, wherein the predetermined limit corresponds to one of: the voltage, the current, and the voltaic arc impedance.

* * * * *